(12) United States Patent
Standefer, III et al.

(10) Patent No.: US 10,176,155 B2
(45) Date of Patent: Jan. 8, 2019

(54) MODIFYING A DOCUMENT GRAPH TO REFLECT INFORMATION RELATING TO A DOCUMENT IT REPRESENTS

(71) Applicant: Microsoft Technology Licensing, LLC, Redmond, WA (US)

(72) Inventors: Robert Earl Standefer, III, Duvall, WA (US); Christopher Lee Mullins, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/232,232

(22) Filed: Aug. 9, 2016

(65) Prior Publication Data

US 2018/0046601 A1    Feb. 15, 2018

(51) Int. Cl.
*G06F 17/20* (2006.01)
*G06F 17/24* (2006.01)
*G06F 17/30* (2006.01)
*G06F 17/22* (2006.01)

(52) U.S. Cl.
CPC .......... *G06F 17/24* (2013.01); *G06F 17/2288* (2013.01); *G06F 17/30958* (2013.01)

(58) Field of Classification Search
CPC .................................................. G06F 17/2247
See application file for complete search history.

(56) References Cited

U.S. PATENT DOCUMENTS

| 6,558,431 | B1 | 5/2003 | Lynch et al. |
| 7,039,597 | B1 | 5/2006 | Notani et al. |
| 7,299,257 | B2 | 11/2007 | Boyer et al. |
| 7,389,473 | B1 | 6/2008 | Sawicki et al. |
| 7,496,841 | B2 | 2/2009 | Hadfield et al. |
| 7,617,281 | B2 | 11/2009 | Manion et al. |
| 7,716,263 | B2 | 5/2010 | Masek |
| 7,818,678 | B2 | 10/2010 | Massand |
| 8,060,820 | B2 | 11/2011 | Bedi et al. |
| 8,418,051 | B1 | 4/2013 | Bourdev |
| 8,682,973 | B2 | 3/2014 | Kikin-Gil et al. |

(Continued)

FOREIGN PATENT DOCUMENTS

WO    2015036817 A1    3/2015

OTHER PUBLICATIONS

"How to: Restrict editing specific sections," Retrieved on: May 16, 2016 Available at: https://social.msdn.microsoft.com/Forums/office/en-US/b8c05793-c30c-4bb2-ad71-fbdd62e58d86/how-to-restrict-editing-specific-sections?forum=worddev.

(Continued)

*Primary Examiner* — Keith D Bloomquist
(74) *Attorney, Agent, or Firm* — Michael Best & Friedrich LLP (57) ABSTRACT

A content graph data structure representing at least a portion of a document is provided. The data structure includes a first node containing contents authored by a first user. The data structure further includes a second node specifying a proposed edit to the contents of the first node proposed by a second user distinct from the first user, the second node being connected to the first node using an edge of a first type, the edge of the first type connoting that the edit specified by the second node is proposed for the first node, such that the data structure is accessible to identify the second node as specifying an edit proposed for the first node.

17 Claims, 9 Drawing Sheets

(56) References Cited

U.S. PATENT DOCUMENTS

| | | | |
|---|---|---|---|
| 8,689,108 B1 | 4/2014 | Duffield et al. | |
| 8,938,669 B1 | 1/2015 | Cohen | |
| 8,996,985 B1 | 3/2015 | Johnston et al. | |
| 9,037,983 B1 | 5/2015 | Shmulevich et al. | |
| 2003/0167281 A1 | 9/2003 | Cohen et al. | |
| 2004/0030697 A1 | 2/2004 | Cochran et al. | |
| 2006/0026502 A1 | 2/2006 | Dutta | |
| 2007/0220417 A1 | 9/2007 | Mathew et al. | |
| 2008/0270406 A1 | 10/2008 | Flavin et al. | |
| 2009/0019353 A1* | 1/2009 | Abrams | G06F 17/2247 715/224 |
| 2009/0249224 A1 | 10/2009 | Davis et al. | |
| 2010/0095198 A1 | 4/2010 | Bultrowicz et al. | |
| 2011/0029521 A1 | 2/2011 | Thayne et al. | |
| 2011/0178981 A1 | 7/2011 | Bowen et al. | |
| 2012/0179647 A1 | 7/2012 | Crucs | |
| 2012/0233150 A1 | 9/2012 | Naim et al. | |
| 2013/0055074 A1 | 2/2013 | Trese et al. | |
| 2013/0191451 A1 | 7/2013 | Tse et al. | |
| 2013/0212250 A1 | 8/2013 | Kleppner et al. | |
| 2013/0326330 A1* | 12/2013 | Harris | G06F 17/24 715/234 |
| 2014/0019854 A1 | 1/2014 | Alexander et al. | |
| 2014/0257894 A1 | 9/2014 | Melahn et al. | |
| 2014/0280377 A1 | 9/2014 | Frew | |
| 2014/0304618 A1 | 10/2014 | Carriero et al. | |
| 2014/0351687 A1* | 11/2014 | Hall | G06F 17/2247 715/234 |
| 2015/0082196 A1 | 3/2015 | Berger et al. | |
| 2015/0363702 A1* | 12/2015 | Baum | G06N 5/048 706/52 |
| 2015/0370769 A1 | 12/2015 | Pereira Filho et al. | |
| 2016/0041959 A1 | 2/2016 | Beckley et al. | |

OTHER PUBLICATIONS

"Allow changes to parts of a protected document," Retrieved on: May 16, 2016 Available at: https://support.office.com/en-us/article/Allow-changes-to-parts-of-a-protected-document-187ed01c-8795-43e1-9fd0-c9fca419dadf.

"Partially restrict formatting and editing specific parts of a word (Office 2010) document," Retrieved on: May 16, 2016 Available at: https://social.technet.microsoft.com/Forums/office/en-US/08fdfd9e-e354-4ed0-a7ce-f4f467cb00f4/partially-restrict-formatting-and-editing-specific-parts-of-a-word-office-2010-document?forum=officeitproprevious.

Papadopoulou, et al., "How a Structured Document Model Can Support Awareness in Collaborative Authoring", In Poceedings of the International Conference on Collaborative Computing: Networking, Applications and Worksharing, Nov. 12, 2007, 10 Pages.

"International Search Report and Written Opinion Issued in PCT Application No. PCT/US2017/044999", dated Oct. 12, 2017, 14 Pages.

Sarin, et al., "A Process Model and System for Supporting Collaborative Work", In Proceedings of the ACM SIGOIS Bulletin, vol. 12, No. 2-3, Nov. 1991, pp. 213-224.

Birk, Chris, "The Madison Project—An Open Source Document Editing Tool Supporting Commenting, Sharing, and Collaboration," Published on: Jul. 8, 2014, Available at: https://github.com/opengovfoundation/the-madison-project.

"Chat User Manual", Available at:https://support.cometchal.com/documentation/wp contenl/uploads/sites/212013/03/End-user-manuai-Premium-Edition.pdf, Sep. 22, 2016, 64 Pages.

"Collaborative Document Editing", Available at:https://helpcenter.onlyoffice.com/onlyoffice-editors/onlyoffice-document-editor/helpfulhints/collaborativeediting.aspx, Apr. 7, 2016, 4 Pages.

"Doc Collaboration", Available at: https://apihelp.wiki.zoho.com/Doc-Collaboration.html, Sep. 27, 2011, 4 Pages.

"Document collaboration and co-authoring", Available at:https://support.office.com/en-us/article/Document-collaboration-and-co-authoring-ee 1509b4-1 f6e-40 1 e04a-782d26f564a4, Aug. 8, 2016, 9 Pages.

"Overview of co-authoring in SharePoint 2013", Available at: https://technel.microsofl.com/en-IN/library/11718249.aspx, Aug. 5, 2016, 7 Pages.

"Simultaneously edit a document with other authors", Available at: https://support.office.com/en-us/article/Simultaneously-edit-a-document-with-{)ther -authors-2a6059e 7 -9fe9-4e66-8ecdf3d5372c27f4, Aug. 5, 2016, 7 Pages.

"Work together on Office documents in OneDrive", Available at:https://support.office.com/en-us/article/Work-together-{)n-Office-documents-in-OneDrive-ea3807bc-2b73-406f-a8c9-493de18258b, Oct. 31, 2014, 5 Pages.

Carroll, et al., "Notification and Awareness: Synchronizing task-oriented collaborative activity", Published in International Journal of Human Computer Studies, vol. 58, No. 5, May 2003, 26 Pages.

Hayashi, et al., "Activity Awareness: A Framework for Sharing Knowledge of People, Projects, and Places", In Proceedings of the Sixth European Conference on Computer-Supported Cooperative Work, Sep. 12, 1999, 20 Pages.

Hoffman, Chris, "How to Collaborate on Documents Over the Internet", Available at: http:/lwww .howfogeek.com/183176/how-to-collaborate-{)n-documents-over -the-internet/, Feb. 23, 2014, 4 Pages.

Holzner, et al., "Google Docs 4 Everyone", In Publication of FT Press, Feb. 9, 2009, 2 Pages.

Laskaris, John, "Planning Collaboration Activities", Available at:https://www.efrontlearning .com/blog/20 15/11/planning-collaboration-activities.html, Nov. 2015, 10 Pages.

Moran, et al., "Document Presence Notification Services for Collaborative Writing", In Proceedings of the Seventh International Workshop on Groupware, Sep. 6, 2001, 9 Pages.

"Invitation to Pay Additional Fee Issued in PCT Application No. PCT/US17/064388", dated Feb. 19, 2018, 5 Pages.

Reynolds, Michael, "How to Collaborate With Google Docs", Available at:https://blog.spinweb.nel/how-to-collaborate-with-google-docs, May 23, 2013, 21 Pages.

* cited by examiner

MODIFYING A DOCUMENT GRAPH TO REFLECT INFORMATION RELATING TO A DOCUMENT IT REPRESENTS

BACKGROUND

Electronic documents can contain content such as text, spreadsheets, slides, diagrams, charts, and images. Electronic documents can be the subject of a variety of activities, performed by a variety of people. These can include, for example: authoring a document, proposing edits to a portion of a document, commenting on those edits, providing feedback on a portion of a document, etc.

SUMMARY

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

A content graph data structure representing at least a portion of a document is provided. The data structure includes a first node containing contents authored by a first user. The data structure further includes a second node specifying a proposed edit to the contents of the first node proposed by a second user distinct from the first user, the second node being connected to the first node by an edge of a first type, the edge of the first type connoting that the edit specified by the second node is proposed for the first node, such that the data structure is accessible to identify the second node as specifying an edit proposed for the first node.

DETAILED DESCRIPTION

The inventors have recognized that conventional ways of representing an electronic document (hereafter simply "document") and related information make inefficient use of storage and processing resources, and make useful ways of exploiting this information difficult or impossible to implement.

In response to this recognition, the inventors have conceived and reduced to practice a software and/or hardware facility ("the facility") for modifying a graph representing a stored document to reflect information relating to the document, such as proposed edits to the document, comments on proposed edits, and feedback on the document, among other information relating to the document.

Figure 2:
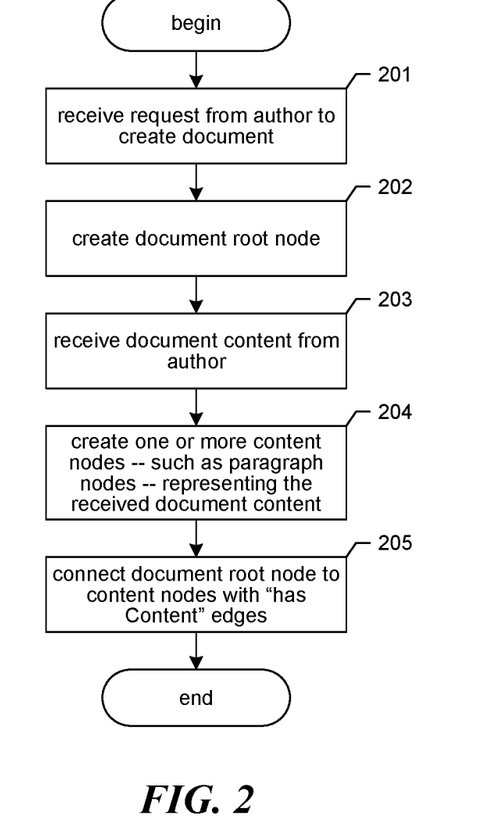
FIG. 2 is a flow diagram showing a process performed by the facility in some embodiments to construct a content graph representing a document.
Figure 3:
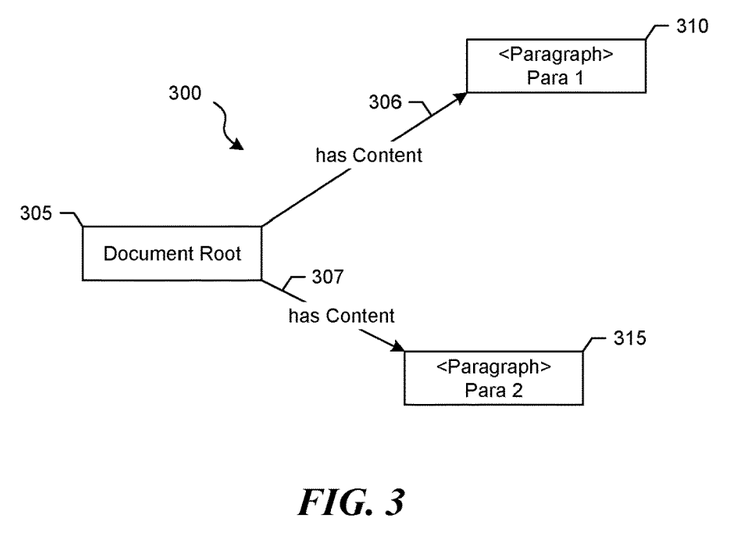
FIG. 3 is a data structure diagram showing a sample content graph constructed by the facility in some embodiments to store a document.

In some embodiments, the representation of each document augmented by the facility includes a root node representing the document, as well as one or more content nodes each containing content of the document. For example, a textual document may include content nodes each corresponding to a portion of the document at various levels of granularity, such as sections, chapters, pages, paragraphs, sentences, phrases, words, etc., while a slideshow document may include content nodes each corresponding to a portion of a slide, a single slide, a group of slides, etc. In some embodiments, a document's root node is connected to each of the content nodes containing the document's content by a link or "edge." In particular, the edges that connect a document's root node to each of its content nodes are "has Content" edges, indicating that the document represented by the root node includes the content contained by each of these content nodes. One version of this process is shown in FIGS. 2 and 3, discussed below. In various embodiments, "has Content" edges and edges of other types are represented in various ways, including storing an edge type identifier with a reference to the node that is the destination of an edge in the node that is the origin of the edge; storing references to both the node that is the origin of an edge and the node that is the destination of the edge with an edge type identifier in a specialized edge table; combinations of the above, and/or using other edge representation schemes.

In some embodiments, the facility stores each instance of feedback on a content node in a feedback node, connected to the content node by a "feedback On" edge. In some embodiments, in order to identify the user who generated the feedback, a user node representing this user is in turn connected to the feedback node by a "provides" edge. In some embodiments, in response to the connection of a feedback node to a content node by a "feedback On" edge, the facility notifies the author of the document about the feedback, and asks the author to specify whether the feedback should be made available to users viewing the document, and, in particular, the content node within the document to which the feedback applies. If the author chooses to do so, the facility connects the document root node to the feedback node by an "includes" edge. When a portion of the document including the content node is subsequently materialized for display to a user, if the feedback node is connected to the document root node, the feedback in the feedback node is (or can be) included in the materialized document. One version of this process is shown in FIGS. 4, 5, 10, and 11, discussed below.

In some embodiments, the facility stores each instance of editing a content node in an edit node, connected to the content node by a "suggested edit Of" edge. In some embodiments, in order to identify the user generating the proposed edit, a user node representing this user is in turn connected to the edit node by a "proposes" edge. In some embodiments, in response to the connection of an edit node to a content node by a "suggested edit Of" edge, the facility notifies the author of the document about the proposed edit, and asks the author to specify whether the proposed edit should be applied to the document. If the author chooses to do so, the facility: creates a new content node reflecting the proposed edit; connects this new content node to the edit node with an "accepts" edge; connects the new content node to the original content node with an "originated From" edge; connects the document root node to the new content node with a "has Content" edge; and deletes the "has Content" edge from the document root node to the original content node. When a portion of the document including the content node is subsequently materialized for a user, based upon the new content node's connection to the document root node by a "has Content" edge and the absence of a connection of the original content node to the document root node by a "has Content" edge, the content in the new content node that reflects the edit is (or can be) included in the materialized document. The "originated From" edge indicates the history of the contents of the content node, while the "accepts" edge identifies the edit that produced the new content node and, indirectly, the user that generated the edit. One version of this process is shown in FIGS. 5, 6, 8, and 9, discussed below.

Figure 5:
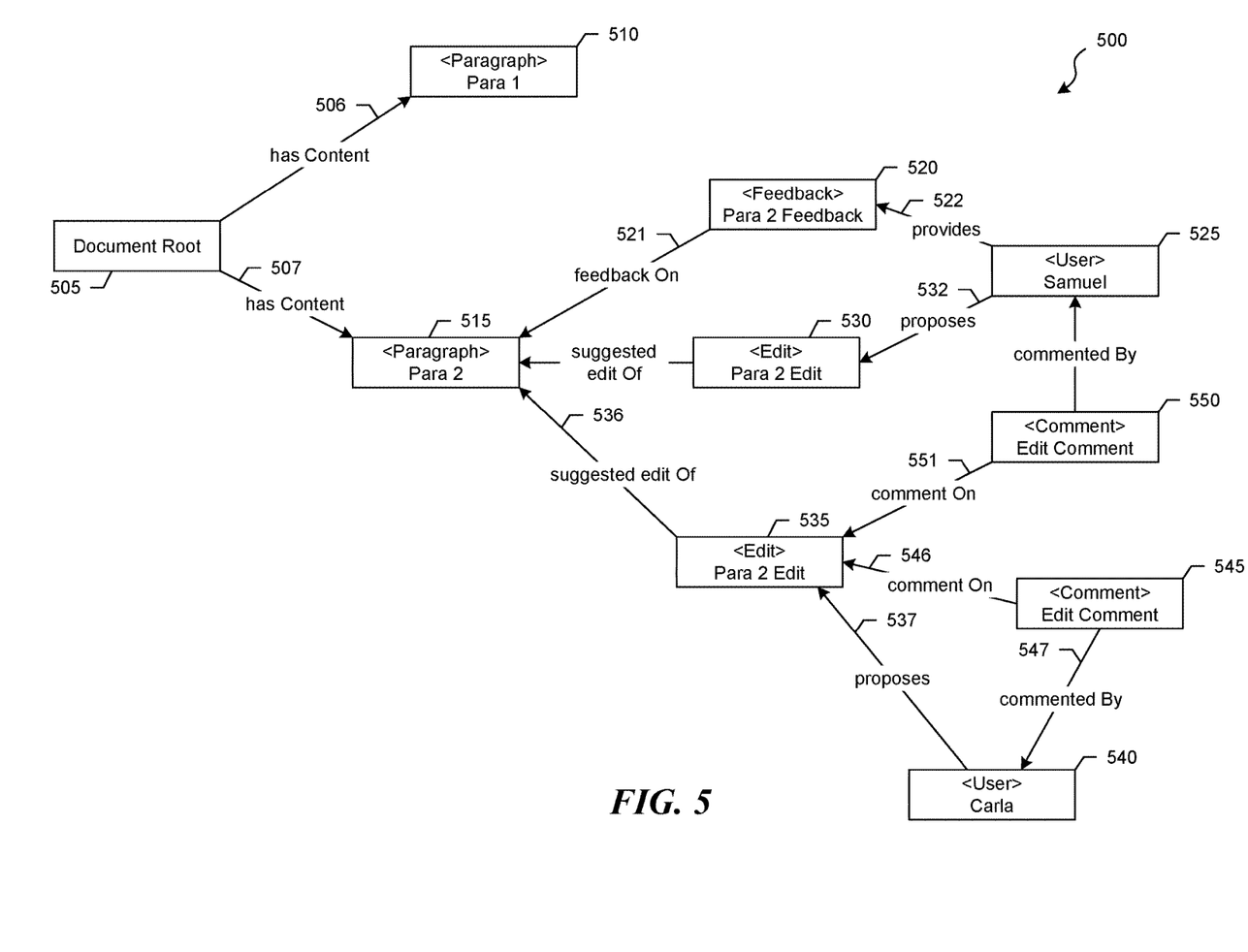
FIG. 5 is a data structure diagram showing a sample content graph reflecting the storage of feedback, proposed edits, and comments on proposed edit by the facility in some embodiments.
Figure 7:
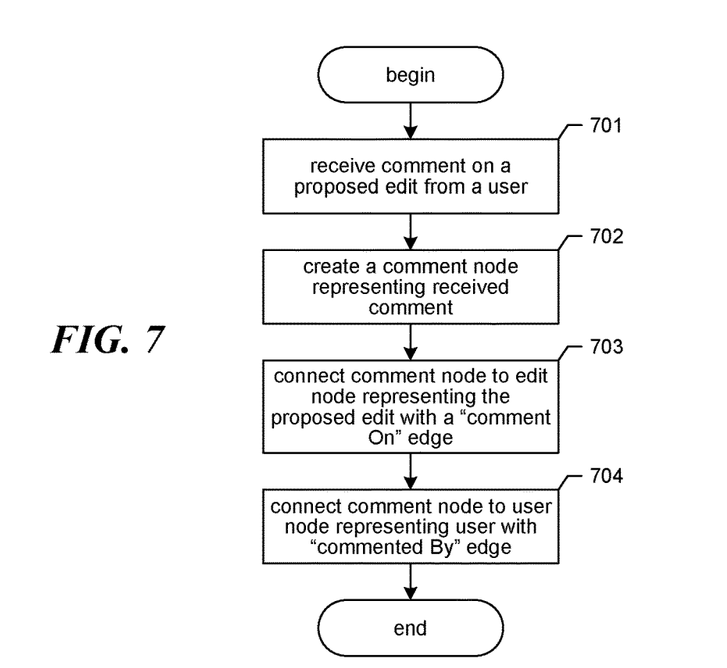
FIG. 7 is a flow diagram showing a process performed by the facility in some embodiments to store a comment on a proposed edit to the content node.

In some embodiments, the facility stores each comment on an edit in a comment node, connected to the edit node to which the comment applies by a "comment On" edge. In some embodiments, in order to identify the user who generated the comment, a user node representing this user is in turn connected to the comment node by a "commented By" edge. In some embodiments, in response to the connection of a comment node to an edit node by a "commented By" edge, the facility notifies the author of the document about the comment, and asks the author to specify whether the should be made available to users viewing the document. If the author chooses to do so, the facility connects the document root node to the comment node by an "includes" edge. When a portion of the document including the content node connected to the edit node that is in turn connected to the comment node is subsequently materialized for a user, if the comment node is connected to the document root node, the comment in the comment node is (or can be) included in the materialized document. One version of this process is shown in FIGS. 5 and 7, discussed below.

By performing in some or all of the ways described above, the facility substantially increases the usability and usefulness of the information relating to a document by, for example, making it straightforward to: identify all of the information relating to a document or portion thereof; identify all the information relating to various documents generated by a particular user or group of users; enable a document's author or other authorized person to accept and/or publish information relating to a document generated by other users; determine the history of generating information relating to a document or portion thereof; materialize different versions of a document using various combinations of information relating to the document, based on such factors as the identity, roles, and permissions of the person for whom the document is being materialized, explicit instructions or standing preferences from the user for whom the document is being materialized; etc.

Also, by performing in some or all of the ways described above and storing, organizing, and/or accessing information relating to a document in an efficient way, the facility meaningfully reduces the hardware resources needed to store and exploit this information, including, for example: reducing the amount of storage space needed to store the information relating to a document; and reducing the number of processing cycles needed to store, retrieve, or process the information relating to a document. This allows programs making use of the facility to execute on computer systems that have less storage and processing capacity, occupy less physical space, consume less energy, produce less heat, and are less expensive to acquire and operate. Also, such a computer system can respond to user requests pertaining to information relating to a document with less latency, producing a better user experience and allowing users to do a particular amount of work in less time.

Figure 1:
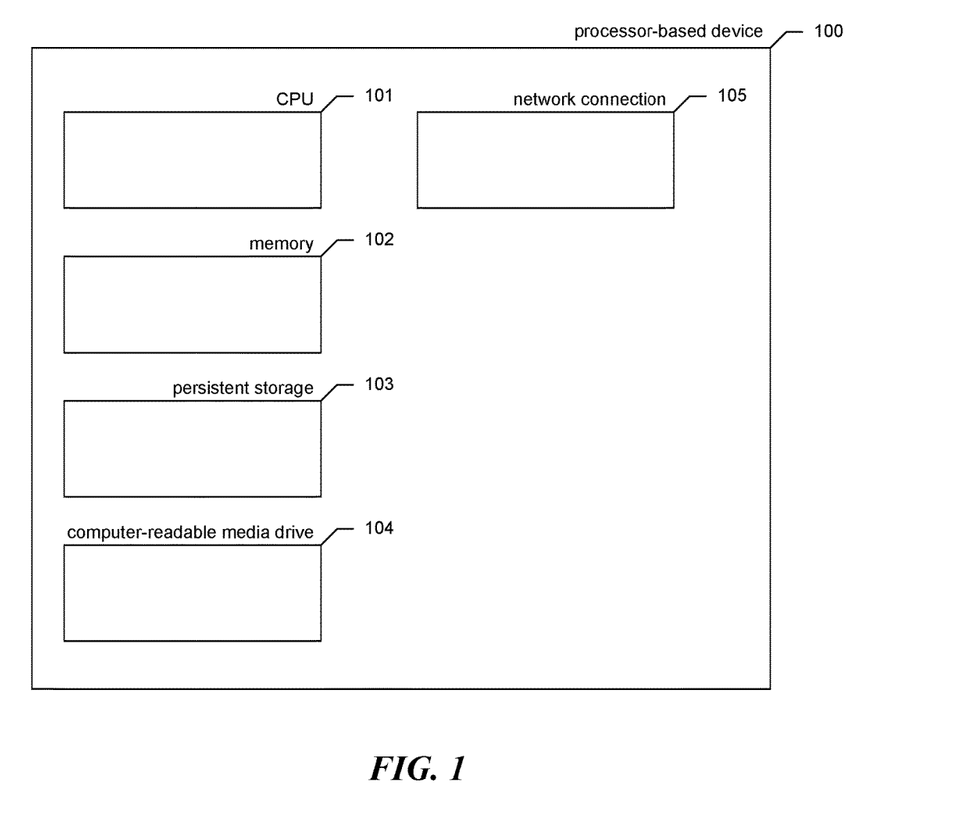
FIG. 1 is a block diagram showing some of the components typically incorporated in at least some of the computer systems and other devices on which the facility operates.

FIG. 1 is a block diagram showing some of the components typically incorporated in at least some of the computer systems and other devices on which the facility operates. In various embodiments, these computer systems and other devices 100 can include server computer systems, desktop computer systems, laptop computer systems, netbooks, mobile phones, personal digital assistants, televisions, cameras, automobile computers, electronic media players, etc. In some embodiments, the facility executes on one or more layers of virtual machines, which in turn execute on a physical computer system or similar device. In various embodiments, the computer systems and devices include zero or more of each of the following: a central processing unit ("CPU") 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

FIG. 2 is a flow diagram showing a process performed by the facility in some embodiments to construct a content graph representing a document. In act 201, the facility receives a request from an author to create a document. In act 202, the facility creates a document root node representing the document.

FIG. 3 is a data structure diagram showing a sample content graph constructed by the facility in some embodiments to store a document. Initially, the content graph 300 includes a document root node 305 created in act 202.

Returning to FIG. 2, in act 203 the facility receives document content generated by the author. In act 204, the facility creates one or more content nodes (e.g., paragraph nodes) representing the document content received in act 203. In act 205, the facility connects the document root node to each of the content nodes created in act 204 with "has Content" edges. After act 205, this process concludes.

Returning to FIG. 3, the facility adds paragraph nodes 310 and 315 to the content graph in act 204. The facility connects the document root node to each of these paragraph nodes by a "has Content" edge, 306 and 307.

Those skilled in the art will appreciate that the acts shown in FIG. 2 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 4:
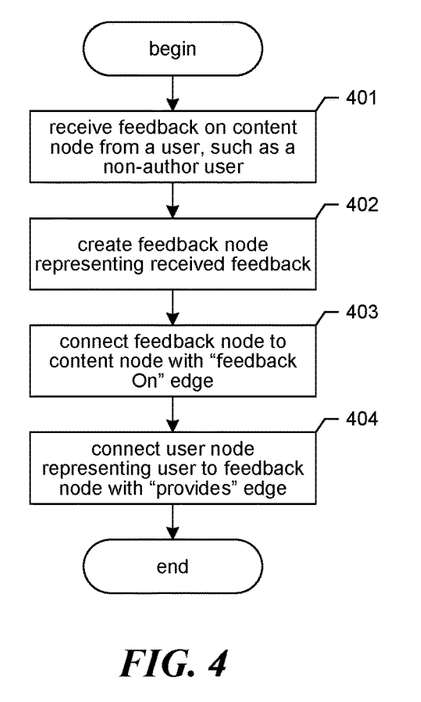
FIG. 4 is a flow diagram showing a process performed by the facility in some embodiments to store feedback generated for a content node.

FIG. 4 is a flow diagram showing a process performed by the facility in some embodiments to store feedback generated for a content node. In act 401, the facility receives feedback on the content node generated by a user, such as a user other than the author. In act 402, the facility creates a feedback node representing the feedback received in act 401. In act 403, the facility connects the feedback node created in act 402 the content node with a "feedback On" edge. In act 404, the facility connects a user node representing the user generating the feedback with a "provides" edge. After act 404, this process concludes.

FIG. 5 is a data structure diagram showing a sample content graph reflecting the storage of feedback, proposed edits, and comments on proposed edit by the facility in some embodiments. The graph 500 includes a feedback node 520 containing feedback on content node 515 created in act 402. The graph further includes a "feedback On" edge 521 added in act 403 that connects this feedback node to content node 515. The graph also includes a "provides" edge 522 added in act 404 that connects a user node 525 for the user who generated the feedback to feedback node 520.

Figure 6:
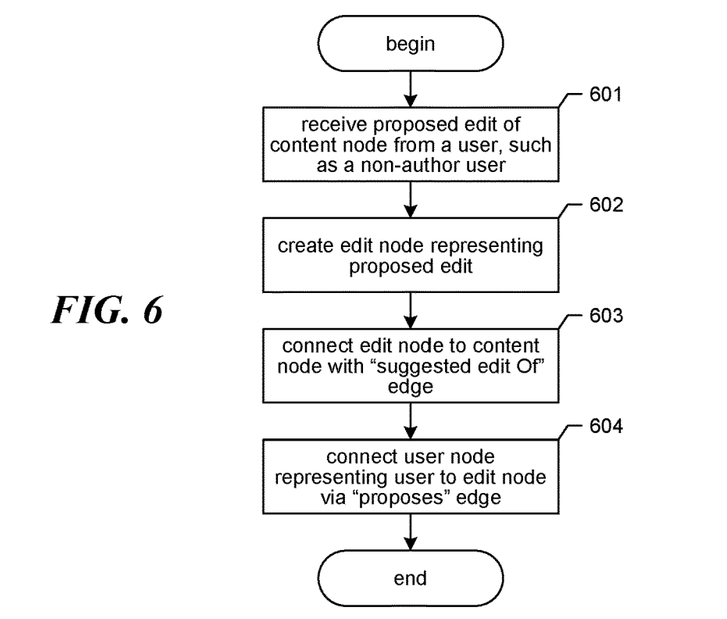
FIG. 6 is a flow diagram showing a process performed by the facility in some embodiments to store a proposed edit of a content node.

FIG. 6 is a flow diagram showing a process performed by the facility in some embodiments to store a proposed edit of a content node. In act 601, the facility receives a proposed edit of the content node generated by a user, such as a user other than the author. In act 602, the facility creates an edit node representing the proposed edit received in act 601. In act 603, the facility connects the edit node created in act 602 to the content node with a "suggested edit Of" edge. In act 604, the facility connects a user node representing the user who generated the edit to the edit node created in act 602 via a "proposes" edge. After act 604, this process concludes.

FIG. 5 discussed above reflects the storage of two proposed edits to the Paragraph 2 content node 515, represented by edit nodes 530 and 535 created in act 602. Created edit node 535, for example, was connected in act 603 to the paragraph two content node with "suggested edit Of" edge 536. A "proposes" edge 537 was added in act 604 to connect to edit node 535 user node 540 representing the user who generated the edit represented by edit node 535.

FIG. 7 is a flow diagram showing a process performed by the facility in some embodiments to store a comment on a proposed edit to the content node. In act 701, the facility receives a comment on the proposed edit generated by a user. In act 702, the facility creates a comment node representing the comment received in act 701. In act 703, the facility connects the comment node created in act 702 to the edit node representing the proposed edit with a "comment On" edge. In act 704, the facility connects the comment node created in act 702 to a user node representing the user who generated the comment with a "commented By" edge. After act 704, this process concludes.

FIG. 5 discussed above reflects the storage of two comments on different proposed edits, represented by comment nodes 545 and 550 created in act 702. The facility connected created comment node 545, for example, in act 703 to edit node 535 with "comment On" edge 546. The facility added a "commented By" edge 547 in act 704 to connect comment node 545 to the user node 540 representing the user generated the comment.

Figure 8:
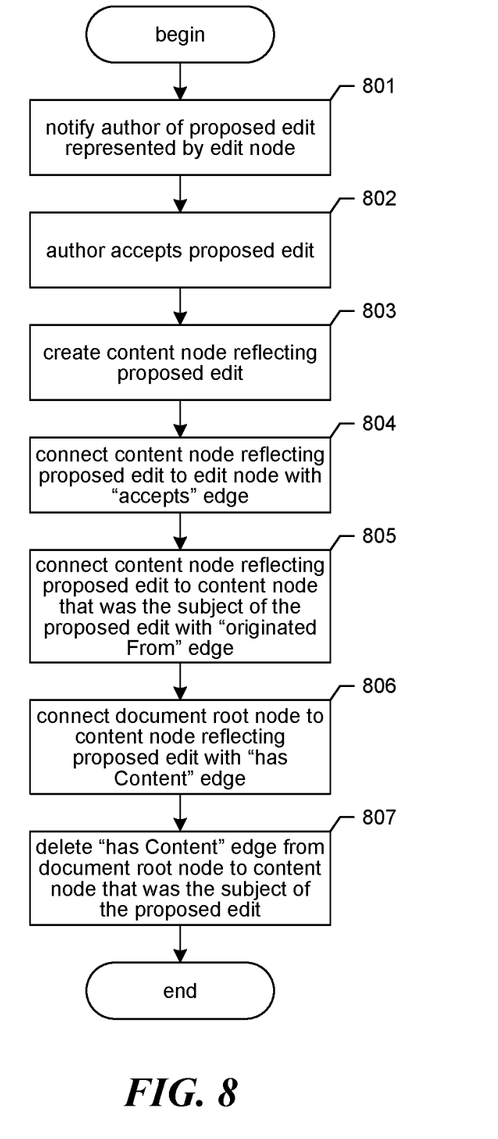
FIG. 8 is a flow diagram showing a process performed by the facility in some embodiments to store acceptance of a proposed edit by a document's author.

FIG. 8 is a flow diagram showing a process performed by the facility in some embodiments to store acceptance of a proposed edit by a document's author. In act 801, the facility notifies a document's author of a proposed edit represented by an edit node that has been connected by a "suggested edit Of" edge to a content node, which is in turn connected to the document root node of the document by a "has Content" edge. As one example, the facility performs the notification of act 801 in response to connection of edit node 535 to content node 515 by "suggested edit Of" edge 536. In some embodiments, this notification is immediate, while in others it trails the establishment of this connection by some amount of time. In various embodiments, the facility performs the notification of act 801 using various notification mechanisms, such as email; text messaging; dynamic work queues; operating system alerts; displaying a message on a webpage, in a management application, in a document editing application, or in a document viewing application; etc. In act 802, the author accepts the proposed edit that is the subject of the notification made in act 801. Where the author does not accept the proposed edit, this process ends without performing acts 803-807 which follow (not shown). In act 803, the facility creates a content node reflecting the proposed edit.

Figure 9:
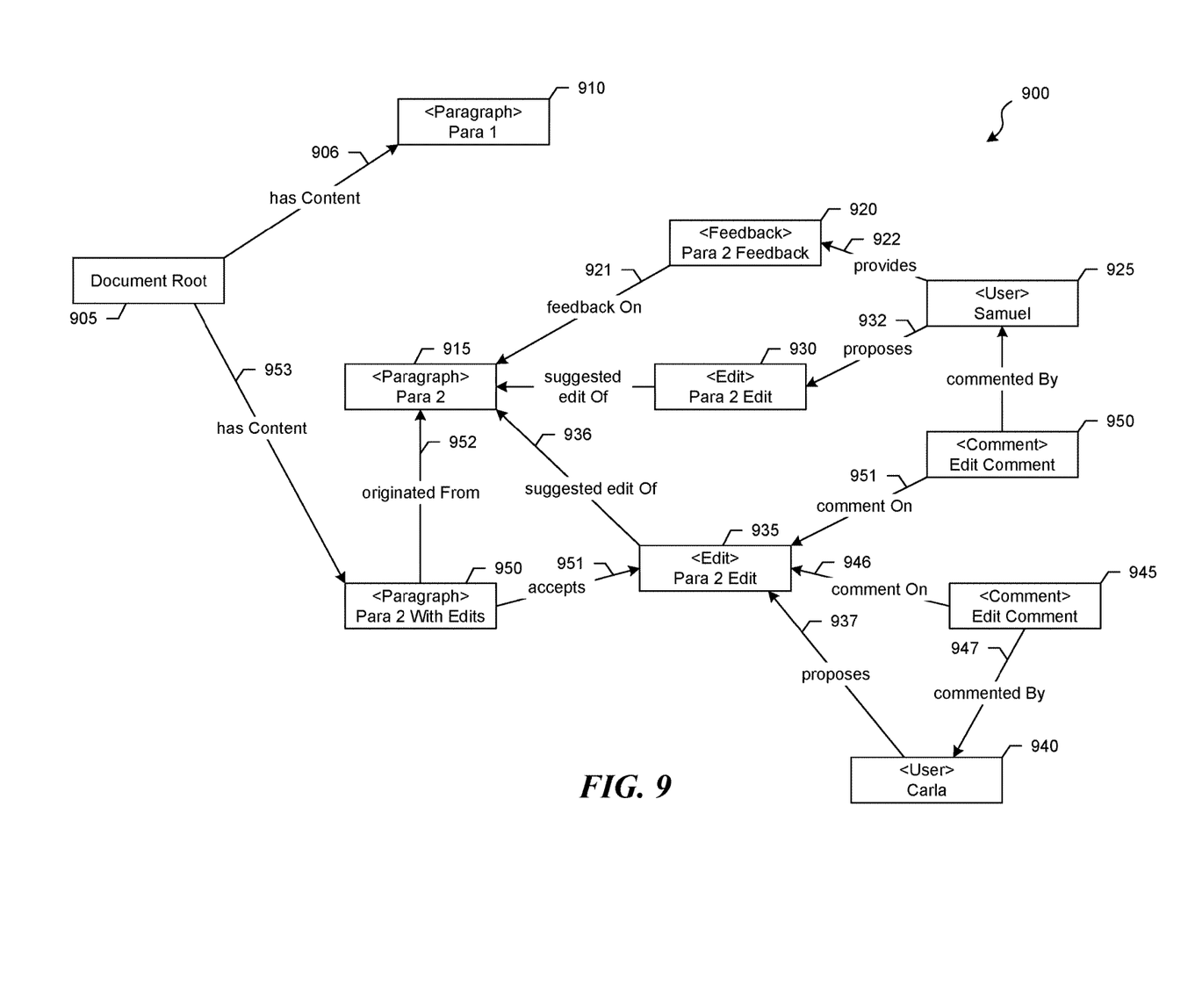
FIG. 9 is a data structure diagram showing a sample content graph reflecting the acceptance of a proposed edit.

FIG. 9 is a data structure diagram showing a sample content graph reflecting the acceptance of a proposed edit. The graph 900 includes a paragraph content node 950 created by the facility in act 803 by applying the edit of edit node 935 to original content node 915.

Returning to FIG. 8, in act 804, the facility connects the new content node created in act 803 to the edit node representing the accepted edit with an "accepts" edge. The facility adds "accepts" edge 951 shown in FIG. 9 in act 803 to connect new content node 950 to edit node 935. In act 805, the facility connects the new content node created in act 803 to the content node that was the subject of the proposed edit with an "originated From" edge. The facility adds "originated From" edge 952 shown in FIG. 9 in act 805 to connect new content node 950 to original content node 915. In act 806, the facility connects the document root node to the new content node with a "has Content" edge. The facility adds "has Content" edge 953 shown in FIG. 9 in act 806 to connect document root node 905 to new content node 950. In act 807, the facility deletes the "has Content" edge from the document root node to the original content node. FIG. 9 does not contain the "has Content" edge 507 that connected the document root node 505 to the original content node 515 in FIG. 5, as the facility deleted it in act 807. After act 807, this process concludes.

Figure 10:
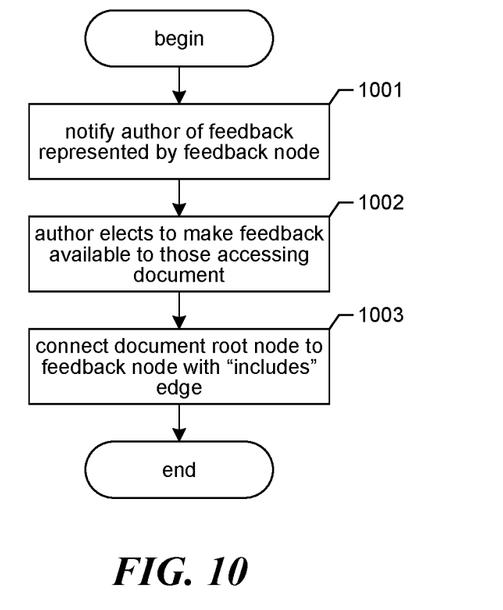
FIG. 10 is a flow diagram showing a process performed by the facility in some embodiments to store an election by a document's author to make feedback on the document available to users accessing the document.

FIG. 10 is a flow diagram showing a process performed by the facility in some embodiments to store an election by a document's author to make feedback on the document available to users accessing the document. In act 1001, the facility notifies a document's author of feedback on the document represented by a feedback node that has been connected by a "includes" edge to the document root node of the document. As one example, the facility performs the notification of act 1001 in response to the connection of feedback node 520 shown in FIG. 5 to content node 515 by "feedback On" edge 521. In act 1002, the author elects to make accessible to those accessing the document the feedback that is the subject of the notification made in act 1001.

Where the author does not make this election, this process ends without performing acts 1003 which follows (not shown). In act 1003, the facility connects the document root node to the feedback node with an "includes" edge. After act 1003, this process concludes.

Figure 11:
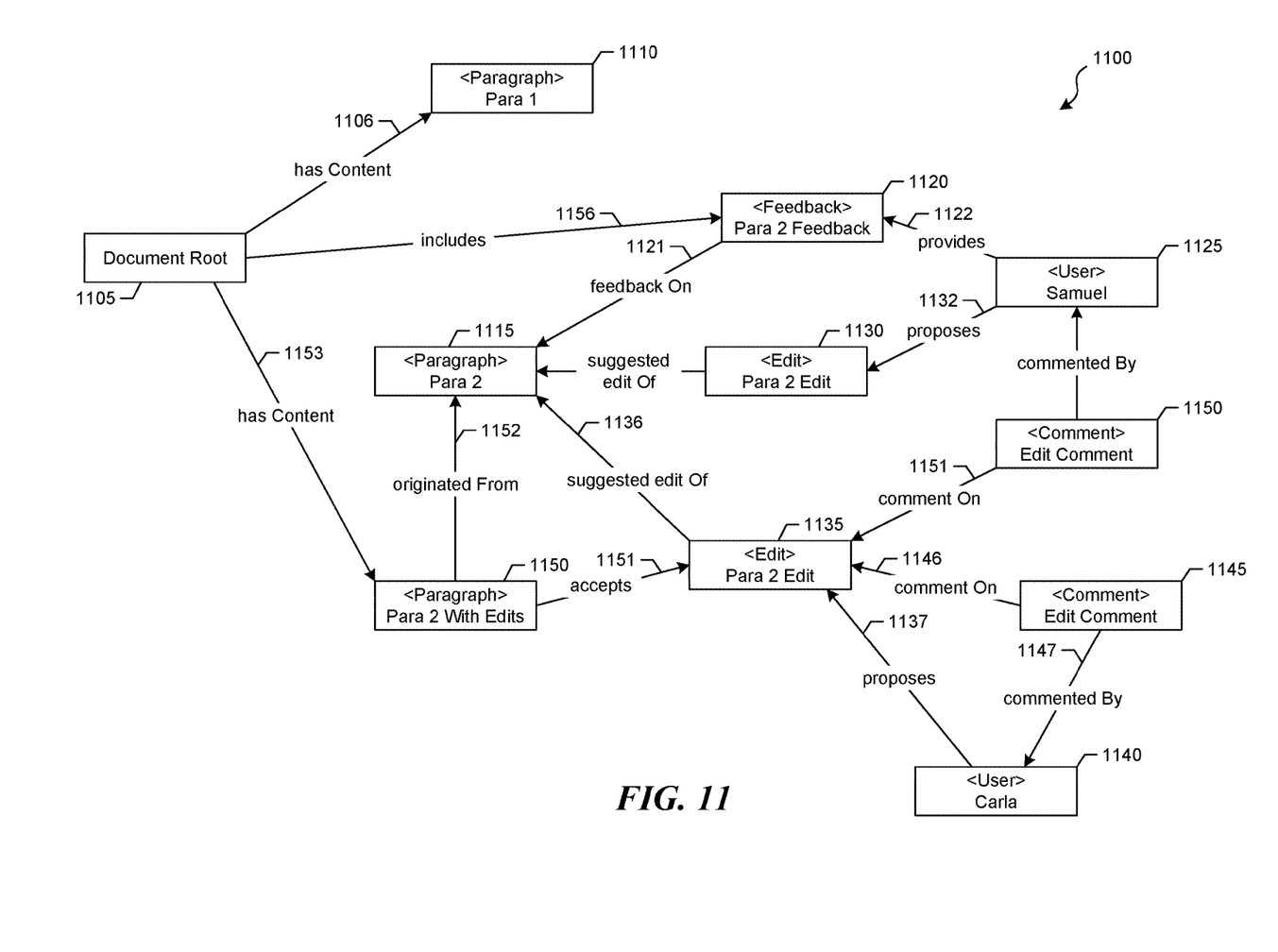
FIG. 11 is a data structure diagram showing a sample content graph reflecting election by a document's author to make feedback on the document available to users accessing the document.

FIG. 11 is a data structure diagram showing a sample content graph reflecting election by a document's author to make feedback on the document available to users accessing the document. The graph 1100 includes an "includes" edge 1156 added by the facility in act 1003 to connect the document root node 1105 to feedback node 1120.

In some embodiments, the facility performs a process similar to the one shown in FIG. 10 in order to make a comment on a proposed edit available to those accessing the document to which the comment relates (not shown).

Many of the edge types discussed herein represent a relationship between a pair of nodes in which each of the two nodes has a different role. For example, relative to a "has Content" edge, the origin node is the node of the pair that the edge indicates has particular content, while the destination node is the node of the pair that the edge indicates contains this content. While edges are shown and described herein as proceeding in a particular direction, in various embodiments edges of some types proceed in the opposite direction, or are bidirectional. As one example, in some embodiments, rather than using "has Content" edges for which the origin node is the node indicated by the edge to have content (e.g., a document root node) and the destination node is the node indicated by the edge to provide that content (e.g., a content node), the facility instead uses "provides Content" edges for which the origin node is the node providing content (e.g., a content node) and the destination node is the node having the content (e.g., a document root node).

While this application uses certain names to refer to particular types of nodes and edges—such as "content nodes" and "has Content" edges, these names are used herein merely as a convenience to the reader; in various embodiments, the facility uses a wide variety of names and/or identifiers to identify particular nodes and edges and types of nodes and edges. Similarly, in various embodiments, the facility is adapted to work with various graph-based content storage systems having a variety of nomenclatures for naming or referring to the entities included in content graphs.

In some embodiments, when connecting a first node to the second node using an edge of a designated type, the facility introduces one or more intermediate nodes between the first and second nodes. In some such embodiments, at least one of the edges collectively joining the first and second nodes are of the designated type. In some such embodiments, the edges are each of a type different from the designated type that, taken together, amount to the designated type.

In some embodiments, the facility provides a method in a computing system, comprising: receiving an edit to contents of a first node in a content graph, the edit proposed by a second user, the first node authored by a first user distinct from the second user; in response to receiving the edit: creating a second node in the content graph specifying the proposed edit; and connecting the second node to the first node using an edge of a first type, the edge of the first type connoting that the edit specified by the second node is proposed for the first node.

In some embodiments, the facility provides a computer-readable medium having contents configured to cause a computing system to: receive an edit to contents of a first node in a content graph, the edit proposed by a second user, the first node authored by a first user distinct from the second user; in response to receiving the edit: create a second node in the content graph specifying the proposed edit; and connect the second node to the first node using an edge of a first type, the edge of the first type connoting that the edit specified by the second node is proposed for the first node.

In some embodiments, the facility provides a computer system comprising: a memory configured to store a computer program for receiving an edit to contents of a first node in a content graph, the edit proposed by a second user, the first node authored by a first user distinct from the second user; in response to receiving the edit: creating a second node in the content graph specifying the proposed edit; and connecting the second node to the first node using an edge of a first type, the edge of the first type connoting that the edit specified by the second node is proposed for the first node; and a processor configured to execute the stored computer program.

In some embodiments, the facility provides a computer-readable medium having contents adapted to cause a computing system to: receive approval of the feedback contained by the second node from the first user; in response to receiving the approval: determine that a third node representing a particular document is connected to the first node using an edge of a third type distinct from the first and second types, the edge of the third type connoting that the document represented by the third node has content that includes the contents of the first node; and connect the third node to the second node using an edge of a fourth type distinct from the first, second, and third types, the edge of the fourth type connoting availability of the feedback for display with the contents of the first node as part of the document.

In some embodiments, the facility provides a method in a computing system, comprising: receiving feedback proffered for contents of a first node in a content graph, the feedback generated by a second user, the first node authored by a first user distinct from the second user; in response to receiving the feedback: creating a second node in the content graph containing the feedback; and connecting the second node to the first node using an edge of a first type, the edge of the first type connoting that the feedback of the second node is proffered for the first node.

In some embodiments, the facility provides a computer system comprising: a memory configured to store a computer program for receiving feedback proffered for contents of a first node in a content graph, the feedback generated by a second user, the first node authored by a first user distinct from the second user; in response to receiving the feedback: creating a second node in the content graph containing the feedback; and connecting the second node to the first node using an edge of a first type, the edge of the first type connoting that the feedback of the second node is proffered for the first node; and a processor configured to execute the stored computer program.

In some embodiments, the facility provides a computer-readable storage medium storing a content graph data structure representing at least a portion of a document, the data structure comprising: a first node containing contents authored by a first user; and a second node specifying a proposed edit to the contents of the first node proposed by a second user distinct from the first user, the second node being connected to the first node using an edge of a first type, the edge of the first type connoting that the edit specified by the second node is proposed for the first node, such that the data structure is accessible to identify the second node as specifying an edit proposed for the first node.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A method in a computing system, comprising:
displaying a non-graph representation of a portion of a document, the document having a storage representation comprising a content graph in which the portion of the document is represented by a first node, wherein the portion of the document is created by a first user;
receiving user input from a second user revising the displayed non-graph representation of the portion of the document;
in response to receiving the user input:
creating a second node in the content graph specifying a revision of the portion of the document based on the received user input; and
connecting the second node to the first node by an edge of a first type, the edge of the first type connoting that the revision specified by the second node is proposed for the first node;
receiving an approval of the revision specified by the second node from the first user; and
in response to receiving the approval:
applying the revision specified by the second node to the portion of the document specified by the first node to obtain resulting content;
creating a third node in the content graph containing the resulting content; and
connecting the third node to the first node by an edge of a second type distinct from the first type, the edge of the second type connoting that the third node originated from the first node.

2. The method of claim 1 wherein the created second node explicitly specifies changes to be made contents of the first node to realize the revision.

3. The method of claim 1 wherein the created second node contains a version of the portion of the document represented by of the first node that has been revised in accordance with the revision.

4. The method of claim 1, further comprising:
in response to receiving the user input:
connecting a fourth node identifying the second user to the second node by an edge of a third type distinct from the first and second types, the edge of the third type connoting that the second user proposed the revision.

5. The method of claim 1, further comprising:
in response to receiving the approval:
connecting the third node to the second node by an edge of a third type distinct from the first and second types, the edge of the third type connoting that the content contained by the third node reflects acceptance of the revision specified by the second node.

6. The method of claim 5, further comprising:
in response to receiving the approval:
determining that a fourth node representing a particular document is connected to the first node by an edge of a fourth type distinct from the first, second, and third types, the edge of the fourth type connoting that the document represented by the fourth node has content that includes the portion of the document specified by the first node; and
connecting the fourth node to the third node by an edge of the fourth type.

7. The method of claim 6, further comprising:
in response to receiving the approval:
removing an edge of the fourth type connecting the fourth node to the first node.

8. The method of claim 1, further comprising:
receiving a comment on the revision specified by the second node;
in response to receiving the comment:
creating a fourth node in the content graph containing the received comment; and
connecting the fourth node to the second node by an edge of a third type distinct from the first and second types, the edge of the third type connoting that the received comment is a comment on the revision.

9. The method of claim 8 wherein the received comment was generated by the second user, further comprising:
in response to receiving the comment:
connecting the third node to a fifth node identifying the second user by an edge of a fourth type distinct from the first, second, and third types, the edge of the fourth type connoting that the second user generated the comment.

10. The method of claim 8 wherein the received comment was generated by a third user distinct from the first and second users, further comprising:
in response to receiving the comment:
connecting the third node to a node identifying a third user distinct from the second user by an edge of a fourth type distinct from the first, second, and third types, the edge of the fourth type connoting that the third user generated the comment.

11. A non-transitory computer-readable medium having contents adapted to cause a computing system to:
display a non-graph representation of a portion of a document, the document having a storage representation comprising a content graph in which the portion of the document is represented by a first node, wherein the portion of the document is created by a first user,
receive user input from a second user revising the displayed non-graph representation of the portion of the document;
in response to receiving the user input:
create a second node in the content graph specifying a revision of the portion of the document based on the received user input; and
connect the second node to the first node by an edge of a first type, the edge of the first type connoting that the revision specified by the second node is proposed for the first node;
receive an approval of the revision specified by the second node from the first user; and
in response to receiving the approval:
apply the revision specified by the second node to the portion of the document specified by the first node to obtain resulting content;
create a third node in the content graph containing the resulting content; and
connect the third node to the first node by an edge of a second type distinct from the first type, the edge of the second type connoting that the third node originated from the first node.

12. The computer-readable medium of claim 11 wherein the contents of the computer-readable medium further cause a computing system to:
in response to receiving the user input:

connect a fourth node identifying the second user to the second node by an edge of a third type distinct from the first and second types, the edge of the third type connoting that the second user proffered the revision.

13. A non-transitory computer-readable storage medium storing a content graph data structure representing at least a portion of a document, the data structure comprising:
   a first node containing the portion of the document authored by a first user;
   a second node that is created in response to a user input of a second user and contains a revision of the portion of the document based on user input, the second node being connected to the first node by an edge of a first type, the first type connoting that the revision of the second node is proffered for the first node; and
   a third node that is created in response to receiving approval of the revision of the second node from the first user and contains the revision as applied to the portion of the document, the third node being connected to the first node by an edge of a second type distinct from the first type, the edge of the second type connoting that the third node originated from the first node.

14. The computer-readable storage medium of claim 13, the data structure further comprising:
   a fourth node identifying the second user, the fourth node being connected to the second node by an edge of a third type distinct from the first and second types, the edge of the third type connoting that the second user proposed the revision.

15. The computer-readable storage medium of claim 13 wherein the third node is connected to the second node by an edge of a third type distinct from the first and second types, the edge of the third type connoting that the content contained by the third node reflects acceptance of the revision specified by the second node.

16. The computer-readable storage medium of claim 13, the data structure further comprising:
   a fourth node containing a comment on the revision specified by the second node, the fourth node being connected to the second node by an edge of a third type distinct from the first and second types, the edge of the third type connoting that the comment of the fourth node is a comment on the revision.

17. The computer-readable storage medium of claim 13, the data structure further comprising:
   a fourth node containing feedback proffered for the portion of the document contained in the first node, the fourth node being connected to the first node by an edge of a third type, the edge of the third type connoting that the feedback of the fourth node is proffered for the first node.

* * * * *